(No Model.)

C. S. COMINS.
Device for Heating Fluids.

No. 229,098.  Patented June 22, 1880.

Witnesses:
Chas. Nida
H. L. Wattenberg

Inventor:
Charles S. Comins
by [signature]
Attorney.

UNITED STATES PATENT OFFICE.

CHARLES S. COMINS, OF BOSTON, MASSACHUSETTS.

DEVICE FOR HEATING FLUIDS.

SPECIFICATION forming part of Letters Patent No. 229,098, dated June 22, 1880.

Application filed April 5, 1880. (No model.)

*To all whom it may concern:*

Be it known that I, CHARLES S. COMINS, of the city of Boston, county of Suffolk, and State of Massachusetts, have invented a new and Improved Device for Heating and Boiling Fluids, &c.; and I do hereby declare that the following is a full, clear, and exact description of the same, reference being had to the accompanying drawings, and to the letters of reference marked thereon, making part of this specification.

This invention is in the nature of an improvement in devices for heating and boiling fluids.

The invention consists in a device for heating and boiling fluids, with a base consisting of a hollow split annulus with inlets and outlets for the admission of steam, and a clamping-screw, whereby the annulus is brought more or less in contact with the base of a superimposed vessel containing the fluid to be heated, as is more particularly hereinafter described.

Figure 1:
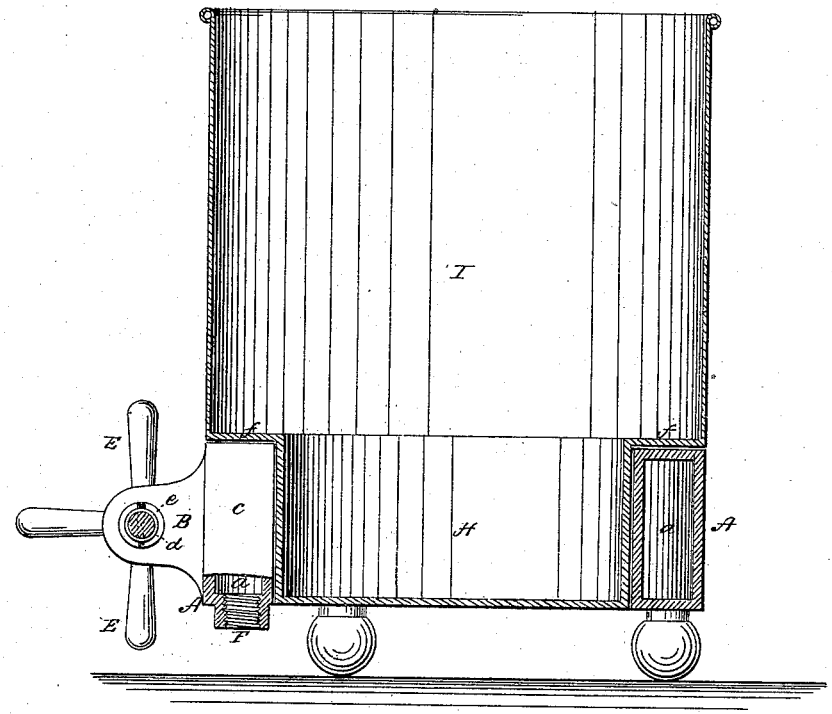
Figure 2:
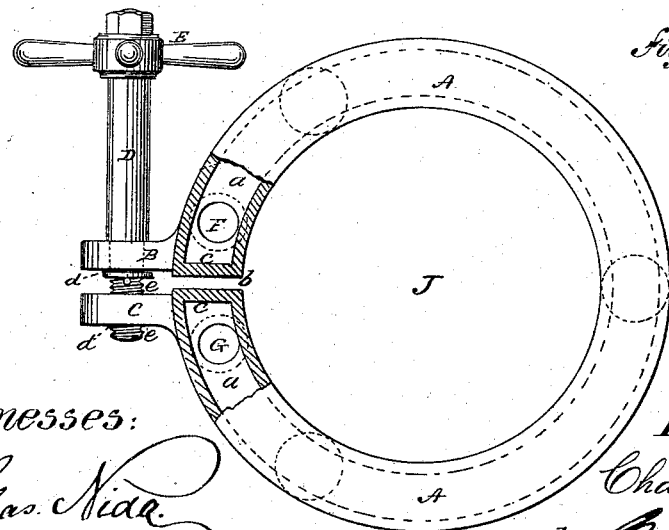

In the accompanying sheet of drawings, Figure 1 represents a vertical section of my invention; and Fig. 2, a plan or top view, partly in section, of the heating-base.

Similar letters of reference indicate like parts in both figures.

A represents the base of my heating and boiling device. This base consists, essentially, of an annulus with a hollow interior, $a$, split at one side, as at $b$, the ends at the split being closed, as at $c$, and with lugs B and C cast or otherwise secured on the annulus, which lugs are on each side of the split $b$. One or both of these lugs may have screw-threads formed in a hole, $d$, which passes through them, and into these holes is fitted the shank $e$ of a screw-shaft, D, with a device, E, for turning the same. In the under side of this annular base, and at or near the split ends of the same, are two openings, F and G. The thickness of metal composing this annular base may be of any suitable degree.

Within the opening J of the base is placed the cylindrical projecting base H of a vessel, I, which contains the liquid that is to be heated. This projecting base should be of a size about equal to or a little less than the opening J of the annular base, and when it is received within this opening the part $f$ rests upon the upper surface of the annular base A.

Now, my device for heating and boiling being constructed substantially as above described, it is operated as follows: The vessel I is placed on the base A so as to rest on the same, with the projecting part H of the vessel within the opening J of the base A. Then steam being admitted into one of the openings F G, it circulates around the hollow interior of the sides of the base, finding exit at the other of the openings F G, and imparting heat to the surface of the projecting part H of the base of the vessel I, and to the part $f$, which rests upon the top of the annular base. Now, when in this position, if it is desired that the fluid in the vessel I shall speedily boil, then the screw-shaft D is turned by the device E to the right, and the annular base, or, more properly, the inner sides of the base A, are brought tightly in contact with the surface of the projection H of the bottom of the vessel within it, and the closer the contact of the base A with this bottom the more rapidly will the fluid boil. The moment the screw-shaft is turned from right to left the annulus, from its elasticity, will spring from around the projection H of the vessel I, and admit a thin stratum of air between the projection H and the inner sides of the base A, which, being a non-conductor, checks the too rapid boiling, and the more this space between the projection H and the sides of the opening J of the base is increased the less heat will be imparted to the base of the vessel, and the boiling be checked; so it will be seen that the fluid in the vessel may be kept at boiling temperature, or hot or warm, as may be desired, by simply turning the device E, and thereby bringing the inner walls of the base A more or less in contact with the surface of the part H, which projects within it. So accurately is this found to be the case in practice that a very slight turning of the device E will sensibly affect the amount of heat imparted to the fluid within the vessel I, and that fluid may therefore be kept at any temperature desired.

I do not wish in this patent to claim, broadly, any of the features described in Letters Patent heretofore issued to me on the 9th day of September, 1879; but,

Having now described my invention, what I claim as new, and desire to secure by Letters Patent, is—

1. A device for heating fluids, with a base consisting of a hollow annulus separated at one side, the separated ends being closed, and provided with a device whereby the annulus may be enlarged or contracted, substantially as and for the purpose described.

2. In a device for heating fluids, a separated annular base with hollow interior and inlet and outlet openings for the ingress and egress of steam, and a device for enlarging or diminishing the annular opening of the base, in combination with a superimposed vessel having its bottom within said annular opening, substantially as and for the purpose described.

CHARLES S. COMINS.

Witnesses:
H. L. WATTENBERG,
G. M. PLYMPTON.